Patented Dec. 26, 1939

2,184,617

UNITED STATES PATENT OFFICE 2,184,617

STABILIZED CUPROUS OXIDE

Loren C. Hurd, Glenside, Pa., assignor to Röhm & Haas Company, Philadelphia, Pa.

No Drawing. Application February 11, 1938, Serial No. 190,036

12 Claims. (Cl. 23—243)

This invention relates to a method for treating cuprous oxide so as to render it less susceptible to oxidation by atmospheric oxygen and to the product resulting from such treatment. It relates more particularly to the prevention of oxidation of cuprous oxide which is in a very finely divided form such as is suitable for use as a fungicide or insecticide and which can be applied as a dust or in the form of an aqueous suspension. It also relates to the prevention of oxidation of cuprous oxide which is in a finely divided form such as is suitable for anti-fouling marine paints.

It is well known that when exposed to the atmosphere, particularly in damp places, cuprous oxide is oxidized to cupric oxide and that the rate of oxidation depends on many factors such as temperature, degree of humidity, acidity of the material, presence of protective material or anti-oxidants, etc. It is known, for example, that samples of cuprous oxide which have a decided acid reaction oxidize more slowly than those which are neutral or slightly on the alkaline side. This phenomenon is more or less general with metal oxides which exist in two or more states of oxidation. In the case of fungicides and insecticides to be used on plants, it is often very desirable to have materials which are nearly neutral so as to avoid any danger of damage to the plants or flowers. The same is true of disinfectants used in treating seeds to prevent damping off.

Various materials have been used in the past to prevent the oxidation of the cuprous oxide, among which mineral oils, hydroquinone and tannic acid have been widely used. These have certain drawbacks and are not entirely satisfactory as means for preventing oxidation. If the cuprous oxide is to be used as a ship-bottom paint, mineral oil is a fairly satisfactory material, particularly as it assists somewhat in dispersing the oxide in the paint vehicle. On the other hand, oil is very disadvantageous when the cuprous oxide is to be used in the form of a dust because even small amounts of oil tend to cause agglomeration and thus destroy the dusting quality of the very fine powder. Likewise, such oil-treated powder cannot be employed readily in the preparation of aqueous suspensions for spraying because the oil-coated particles do not disperse readily in water and, even if dispersed, they tend to sink rather rapidly to the bottom of the container. Tannic acid is not particularly effective as an anti-oxidant and is practically ineffective if the cuprous oxide is substantially neutral.

It is an object of this invention to provide a method for treating finely divided cuprous oxide so as to stabilize it against the oxidizing action of moist air for considerably longer periods of time than has been possible heretofore. It is a further object to provide a stabilized cuprous oxide which when suspended in water will not greatly change the hydrogen ion concentration of the medium. It is another object to provide a method of stabilizing cuprous oxide having a practically neutral reaction and being very susceptible to oxidation. It is a further object to provide a stable cuprous oxide which may be used as a dusting or as a spray fungicide. It is also an object to provide a gel containing relatively large amounts of cuprous oxide, which gel is readily soluble in water.

These objects are accomplished by treating the moist cuprous oxide with a solution of glue, gelatine or other protein-containing lyophillic colloid, thoroughly mixing the two ingredients so that each individual particle of the cuprous oxide is coated with the solution, then evaporating the water preferably under reduced pressure and pulverizing the resulting cake. The powder thus obtained is easily dusted, has no tendency to agglomerate, suspends easily in water and has only a slight tendency to settle out from the suspension.

The amount of glue, gelatine or other protein necessary to protect the cuprous oxide against oxidation by moist air is very small. Usually about 0.2% will suffice but smaller amounts can be used and, if desired, amounts up to 1% or more. Although an increase in the amount of glue above about 0.2% to 0.3% apparently gives no added protection, it is understood that larger or smaller amounts may be used depending upon the characteristics desired in the finished product. For example, it is possible by using larger amounts, 3% to 5%, of glue to prepare a stable gel containing 70% or more of cuprous oxide. Such gels are stable practically indefinitely when stored in closed containers and do not exhibit the phenomenon of syneresis to a marked extent. They are firm enough to retain the shape of the vessel in which they were prepared. Such gels disperse very readily in water and can be used for the preparation of spraying suspensions and other aqueous dispersions containing cuprous oxide. The gels may be prepared by mixing moist cuprous oxide containing about 20% water with a fairly concentrated hot solution containing about 3% to 5% of glue calculated on the dry weight of the cuprous oxide, and allowing the resulting mixture to cool.

The following tables show the preserving effect of various amounts of glue when applied to powdered cuprous oxide having an approximately neutral reaction. The samples were all prepared in the same manner by thoroughly washing a cuprous oxide prepared electrolytically, filtering and pressing the cake so that it contained about 20% water. Weighed portions of this cake were then thoroughly mixed with a fairly concentrated glue solution containing a predetermined amount of glue, filtered, dried in vacuo and pulverized. Uniform distribution of the glue was assured by thorough mixing in a mortar for small laboratory batches or in a suitable mechanical mixer, for example, of the Werner and Pfleiderer type for large batches. The actual method of mixing is immaterial provided the mixing is thorough enough to coat each particle of the cuprous oxide.

In order to test the effectiveness of the protein or protein-containing material, samples of the coated cuprous oxide were placed in open bottles which were exposed to the atmosphere at 100° F. and 95% humidity. This was done in a so-called "tropical chamber" in which the above temperature and humidity were maintained throughout the test. The samples were examined from time to time and the extent of oxidation estimated by observing the change in color. All previous experience has taught that samples of cuprous oxide which have an approximately neutral reaction are particularly susceptible to oxidation and for that reason this type of cuprous oxide was chosen for making the tests described below. The acidity or alkalinity of the sample is listed as pH in the table and this was determined by digesting 50 g. of the cuprous oxide in 100 cc. of distilled water, cooling, filtering and determining the hydrogen ion concentration by means of a glass electrode.

*Series I*

| Percent glue | | pH | Observation |
| Calculated | Found | | |
|---|---|---|---|
| 0.01 | 0.02 | 7.0 | Dark in 2 weeks. |
| 0.03 | 0.03 | 7.2 | Dark in 3 weeks. |
| 0.05 | 0.047 | 7.2 | Dark in 4 weeks. |
| 0.07 | 0.047 | 7.3 | Dark in 5 weeks. |
| 0.10 | 0.086 | 6.9 | Do. |
| 0.20 | 0.14 | 7.2 | Bright red end of 8 weeks. |
| 0.00 | --------- | 7.0 | Dark in 4 days. (Blank.) |

*Series II*

| Percent glue | | pH | Observation |
| Calculated | Found | | |
|---|---|---|---|
| 2.0 | 0.83 | 7.1 | Red end of 20 weeks. |
| 1.5 | 0.79 | 7.0 | Do. |
| 1.0 | 0.50 | 7.6 | Do. |
| 0.5 | 0.25 | 7.8 | Do. |
| 0.25 | 0.19 | 7.9 | Do. |
| 0.00 | --------- | 7.0 | Dark in 4 days. (Blank.) |

*Series III*

| Percent glue | | pH | Observation |
| Calculated | Found | | |
|---|---|---|---|
| 1.0 | 0.48 | 7.0 | Red end of 21 weeks. |
| 0.5 | 0.29 | 7.2 | Do. |
| 0.25 | 0.24 | 8.3 | Do. |
| 0.20 | 0.14 | 7.5 | Red end of 20 weeks. |
| 0.10 | 0.08 | 8.7 | Dark end of 6 weeks. |
| 0.05 | 0.04 | 7.1 | Dark end of 4 weeks. |
| 0.00 | --------- | 7.1 | Black in 1 week. (Blank.) |

*Series IV*

| Percent glue, calculated | pH | Observation |
|---|---|---|
| 0.10 | 6.9 | Dark in 4 weeks. |
| 0.15 | 8.5 | Dark in 8 weeks. |
| 0.20 | 8.7 | Do. |
| 0.30 | 8.2 | Dark in 9 weeks. |
| Blank | --------- | Dark in less than 1 week. |

*Series V*

| Percent glue, calculated | pH | Observation |
|---|---|---|
| 0.10 | 6.8 | Dark in 3 weeks. |
| 0.15 | 7.2 | Do. |
| 0.20 | 8.1 | Dark in 1 week. |
| 0.30 | 8.4 | Dark in 5 weeks. |
| Blank | --------- | Dark in less than one week. |

*Series VI*

At pH of about 4.

| Percent glue, calculated | Observation |
|---|---|
| 0.2 | Bright red end of 11 weeks. |
| 0.6 | Do. |
| 1.6 | Do. |
| 2.0 | Do. |
| 0.0 | Black in 3 weeks. |

*Series VII*

Original $Cu_2O$ showed pH of about 4–5.

| | |
|---|---|
| 1 percent glue | Bright red at end of 20 weeks. |
| 1 percent tannic acid | Black in 3 weeks. |
| Water wash | Black in 1 week. |
| Blank | Black in 3 weeks. |

*Series VIII*

| Percent glue, calculated | pH | Observation |
|---|---|---|
| 1.0 | 7.0 | Bright red end of 8 weeks. |
| 0.5 | 7.2 | Do. |
| 0.25 | 8.3 | Do. |
| 0.20 | 7.5 | Do. |
| 0.10 | 8.7 | Slight darkening in 4 weeks. |
| 0.05 | 7.1 | Slight darkening in 2 weeks. |
| 0.00 | 7.1 | Dark in 3 days. (Blank.) |

Series IX

| Percent glue, calculated | pH | Observation |
|---|---|---|
| 0.01 | 7.0 | Dark in 2 weeks. |
| 0.03 | 7.2 | Dark in 3 weeks. |
| 0.05 | 7.2 | Dark in 4 weeks. |
| 0.07 | 7.3 | Dark in 5 weeks. |
| 0.10 | 6.9 | Do. |
| 0.20 | 7.2 | Bright red end of 8 weeks. |
| 0.00 | 7.0 | Dark in 4 days. (Blank.) |

In the foregoing table the extent of oxidation is indicated by the change in color and the time required to bring about that change. It is evident that even very small amounts of glue have a decidedly beneficial effect in protecting cuprous oxide from oxidation. In all cases the treated cuprous oxide retained its dusting qualities, even though as much as 2% of glue had been used. All samples could be very readily dispersed in water for preparing sprays and under such circumstances practically no agglomeration occurred.

It is to be noted that in some of the series above the calculated amount of glue and that found by analysis vary considerably. This is probably due to incomplete adsorption of the glue by the cuprous oxide so that when the slurry containing the oxide and the glue was filtered some of the latter passed off with the filtrate. The amount of glue remaining was determined by analysing the sample for nitrogen according to the Kjeldahl method and calculating the amount of glue present, the glue used having been previously analysed by the same method.

Glues from different sources have been examined. That used in the foregoing examples was an ordinary, commercial glue prepared from green bone or markets' and restaurants' bone by the open kettle process.

It is known that oils also exert a protective action on cuprous oxide and, since some glues may contain some oil, the following series was run to test glues made by the naphtha extraction process in comparison with those made by the open kettle process.

In this series the pH of all samples was between 6.5 and 6.9. The blank for all tests was dark at the end of three weeks.

Series X

Domestic glue from fresh green bone made by open kettle process. N-content 14.59%. Samples of Cu₂O containing 0.14%, 0.17% and 0.27% glue by analysis were all bright red at the end of 18 weeks.

Series XI

Domestic glue from junk bone by the naphtha extraction process. N-content 14.91%. Samples of Cu₂O containing 0.12%, 0.14%, 0.22% and 0.32% glue by analysis were all bright red at the end of 18 weeks.

Series XII

Imported glue made from green and junk bone by naphtha extraction process. N-content 14.34%. Samples of Cu₂O containing 0.14%, 0.20% and 0.29% glue by analysis were all bright red at the end of 18 weeks.

Series XIII

Domestic glue made from junk bone by naphtha extraction process. N-content 14.83%. Samples of Cu₂O containing 0.08%, 0.13%, 0.18% and 0.47% glue by analysis were all bright red at the end of 18 weeks.

Series XIV

Domestic glue probably from junk bone. N-content 15.23%. Samples of Cu₂O containing 0.15% and 0.29% glue by analysis were bright red at the end of 18 weeks.

The foregoing sets of tests were discontinued at the end of 18 weeks at which time there was no indication of discoloring at any place in any of the samples.

Series XV

Samples of cuprous oxide protected with 0.2%, 0.5% and 1.0% of egg albumin remained unchanged for more than five weeks whereas the unprotected cuprous oxide was dark at the end of one week.

Series XVI

Cuprous oxide coated with 0.2%, 0.5% and 1.0% of highly purified hide gelatine and samples coated with the same amounts of photographic gelatine were bright red after five weeks' exposure in the tropical chamber whereas the blank was dark in one week.

Thus, the process of this invention may be practiced with any of the commercial grades of glue and gelatine, or egg albumin.

In the following claims the term "glue" is intended to include all grades of glue or gelatine from those of highest purity such as photographic gelatine to the less highly refined, ordinary, commercial glues.

Other protein-containing materials, particularly those which are soluble in water, also protect cuprous oxide against oxidation by air but those which are not very soluble or which are rendered soluble only by the addition of strong alkalies are not so effective as glues or gelatine. For example, dark grade blood albumin which is not very soluble when present in the amount of about 1% does not protect cuprous oxide for more than a week whereas the light grade blood albumin, present in the same amount, is effective in protecting cuprous oxide for a period of more than five weeks. Casein is also effective for about four weeks when present to the extent of about 1% but, on account of the presence of strong alkali necessary to peptize the casein, the cuprous oxide thus protected is not nearly so stable as that which has been protected by glue.

I claim:

1. Finely divided cuprous oxide stabilized against oxidation with a thin coating of protein on the individual particles.

2. Finely divided cuprous oxide stabilized against oxidation with a thin coating of glue on the individual particles.

3. Finely divided cuprous oxide having a thin coating of glue on the individual particles, the proportion of glue being less than about 2% by weight.

4. Finely divided cuprous oxide having a thin coating of glue on the individual particles, the proportion of glue being about 0.2% by weight.

5. Substantially neutral, finely divided cuprous oxide stabilized against oxidation with a thin coating of glue on the individual particles.

6. A composition of matter consisting of cuprous oxide and a lyophillic protein colloid, said lyophillic protein colloid comprising between 0.05% and 2.0% by weight of the mass.

7. A composition of matter consisting of cuprous oxide dispersed throughout a matrix of lyophillic protein gel, said gel being capable of re-solution when treated with water.

8. A composition of matter consisting of finely divided, essentially anhydrous cuprous oxide having a thin coating of glue on the individual particles, the proportion of glue being between 0.05% and 2.0% by weight.

9. Finely divided cuprous oxide having a thin coating of a lyophillic protein on the individual particles, said protein constituting not over about 2% of the mass by weight.

10. Stable, substantially neutral, finely divided cuprous oxide having a thin coating of glue on the individual particles, said coating constituting not over about 2% of the mass by weight.

11. A composition of matter consisting essentially of dry cuprous oxide having a thin coating of a colloidal lyophillic protein on the individual particles, the proportion of protein being between 0.05% and 2% by weight.

12. A composition of matter containing water and cuprous oxide dispersed in a lyophillic protein gel, the cuprous oxide constituting at least 70% of the composition.

LOREN C. HURD.